United States Patent [19]

Schwartz et al.

[11] 4,322,122
[45] Mar. 30, 1982

[54] CIGARETTE LIGHTER PLUG ASSEMBLY

[76] Inventors: Edwin L. Schwartz, 16604 Park Lane Pl., Los Angeles, Calif. 90049; Allan W. Langan, 11221 Dalerose Ave., Inglewood, Calif. 90304

[21] Appl. No.: 139,418

[22] Filed: Apr. 11, 1980

[51] Int. Cl.³ .................... H01R 13/66; H01R 3/00
[52] U.S. Cl. .................................. 339/147 P; 339/208
[58] Field of Search .............. 339/197 R, 197 P, 208; 337/187, 190, 192, 213, 214

[56] References Cited

U.S. PATENT DOCUMENTS

| 1,784,388 | 12/1930 | Propp | 337/213 X |
| 3,377,610 | 4/1968 | Busch et al. | 339/208 X |
| 4,109,988 | 8/1978 | Olson | 339/147 R X |
| 4,261,634 | 4/1981 | Robinson | 339/147 R |

Primary Examiner—Eugene F. Desmond
Attorney, Agent, or Firm—John J. Posta, Jr.

[57] ABSTRACT

An improved cigarette lighter plug assembly is provided. The assembly is adapted to obtain current from a vehicle's electrical system through a cigarette lighter for operating remote electrical devices and the like. The assembly comprises, in combination, a hollow cylindrical plug body formed of two releasably joined halves within which is disposed a fuse retainer having a typical automotive glass fuse bearing a metal cap at each end. A first spring contact in the plug body biases the front end of the fuse retainer out the open front end of the plug and the front end of the fuse forward of the fuse retainer so that the fuse can directly contact an electrical terminal in the inner end of a cigarette lighter receptacle. Suitable detents in the plug body and fuse retainer prevent forward escape of the fuse retainer and fuse from the assembly. A second spring contact extends out the side thereof for wedging contact with a second electrical terminal in the sidewall of the receptacle. Both spring contacts are connected in the plug body to electrical conduits or leads extending rearwardly of the plug body as an electrical cord. The assembly is effective and simple, inexpensive to fabricate and assemble and easy to replace the fuse.

2 Claims, 8 Drawing Figures

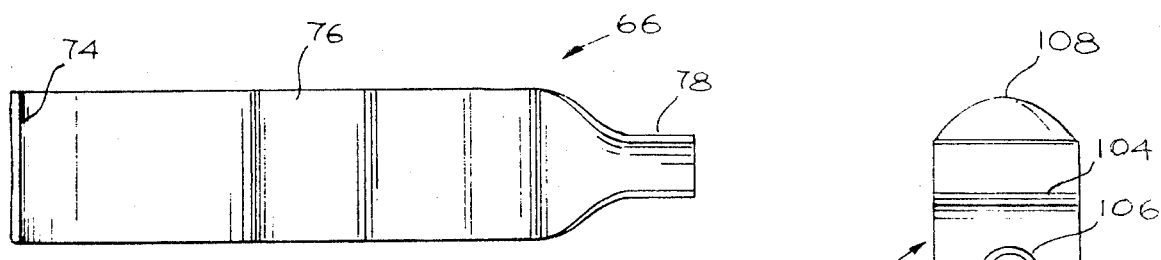
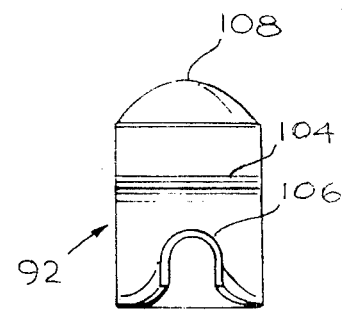
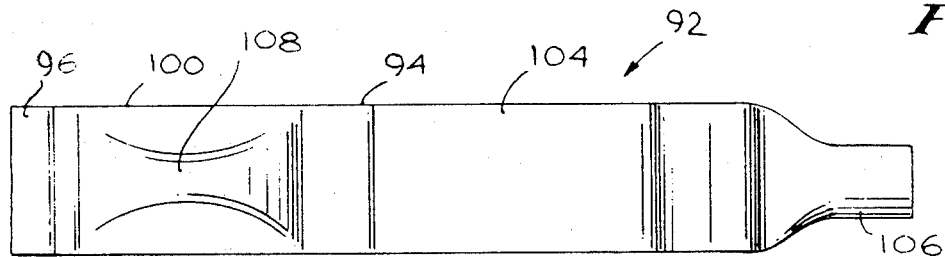
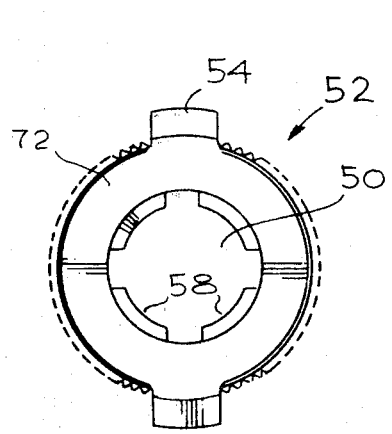
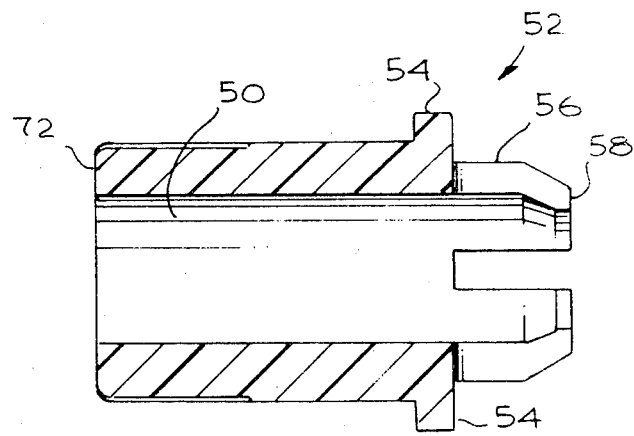
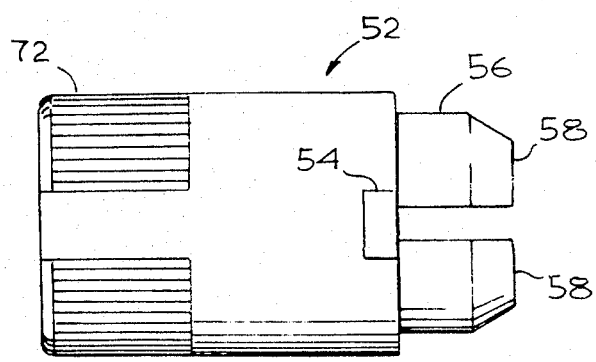
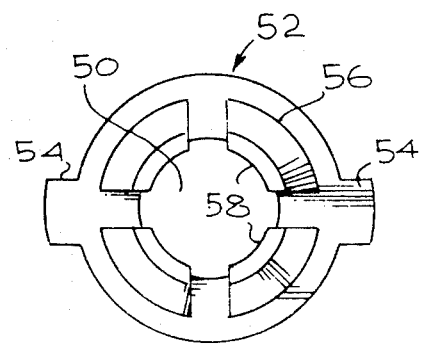

CIGARETTE LIGHTER PLUG ASSEMBLY

BACKGROUND OF THE INVENTION

1. Field of the Invention

The present generally relates to electrical connectors and more particularly, to an improved cigarette lighter plug assembly.

2. Prior Art

A number of devices have been developed for the purpose of tapping into and utilizing the electrical system of vehicles in order to operate accessories such as T.V. sets, tape and cassette recorders, tire pumps, electric shavers, portable lights and beacons, etc. Certain of such devices connect directly to the vehicle's battery but are inconvenient because they require the vehicle hood to be raised. Other devices connect directly to a portion of the cigarette lighter which is conventionally provided in the vehicle passenger compartment and thus, are easier to reach and use. These devices are usually inserted into the lighter receptacle or socket and contact the electrical terminal on the inner end of the receptacle as well as the electrical terminal comprising the sidewall of the receptacle. Such devices are of various forms, one being shown in U.S. Pat. No. 2,954,544 and another in U.S. Pat. No. 3,377,610. Each of such devices has one or more shortcomings. Most are complicated and expensive to fabricate, assemble and repair. Moreover, some are subject to electrical malfunctions due to ready detachment from electrical conduits connected theeto and/or improper contacting with one or both electrical terminals in the cigarette lighter receptacle. Certain older models also do not have satisfactory safety means, such as fuses, incorporated therein.

Accordingly, there still is a need for a safe, inexpensive, durable and efficient cigarette lighter plug assembly which assures maintenance of full electrical contact with the cigarette lighter receptacle. Such assembly should preferably employ a fuse which is easy to replace when needed.

SUMMARY OF THE INVENTION

The foregoing needs have been satisfied by the improved cigarette lighter plug assembly of the present invention. The assembly is substantially as set forth in the Abstract above, thus, it includes a plug body (which is preferably made in the form of two interconnected halves), and a fuse retainer and fused retained within the plug body and both extending forwardly thereof, but with the front end of the fuse forward of the fuse retainer so that the fuse itself can directly contact one of the electrical terminals in a cigarette lighter receptacle. The assembly also includes a first and second spring contact means and electrical conduits connected thereto in the plug body and extending rearwardly thereof. The plug body includes fuse retainer detent means and spring guide means which may include strain prevention means while the fuse retainer itself contains retaining means to prevent escape of the fuse.

The first spring contact biases the fuse retainer and fuse forwardly against the detent means and retaining means, respectively, while the second spring contact provides electrical connection through the sidewall of the plug with the receptacle sidewall. The plug body and fuse retainer can be molded of plastic and the whole assembly can be easily put together and the fuse retainer easily removed when the fuse is to be replaced. Further features are set forth in the following detailed description and accompanying drawings.

BRIEF DESCRIPTION OF THE DRAWINGS

FIG. 2 is a schematic top plan view of a first spring contact of the assembly of FIG. 1;

FIG. 3 is a schematic top plan view of a second spring contact of the assembly of FIG. 1;

FIG. 4 is a schematic rear elevation of the second spring contact of the assembly of FIG. 1;

FIG. 5 is a schematic front elevation of the fuse retainer of the assembly of FIG. 1;

FIG. 6 is a schematic longitudinal cross-section of the fuse retainer of FIG. 1;

FIG. 7 is a schematic side elevation of the fuse retainer of FIG. 1; and

FIG. 8 is a schematic rear elevation of the fuse retainer of FIG. 1.

DESCRIPTION OF THE PREFERRED EMBODIMENT

Figure 1:
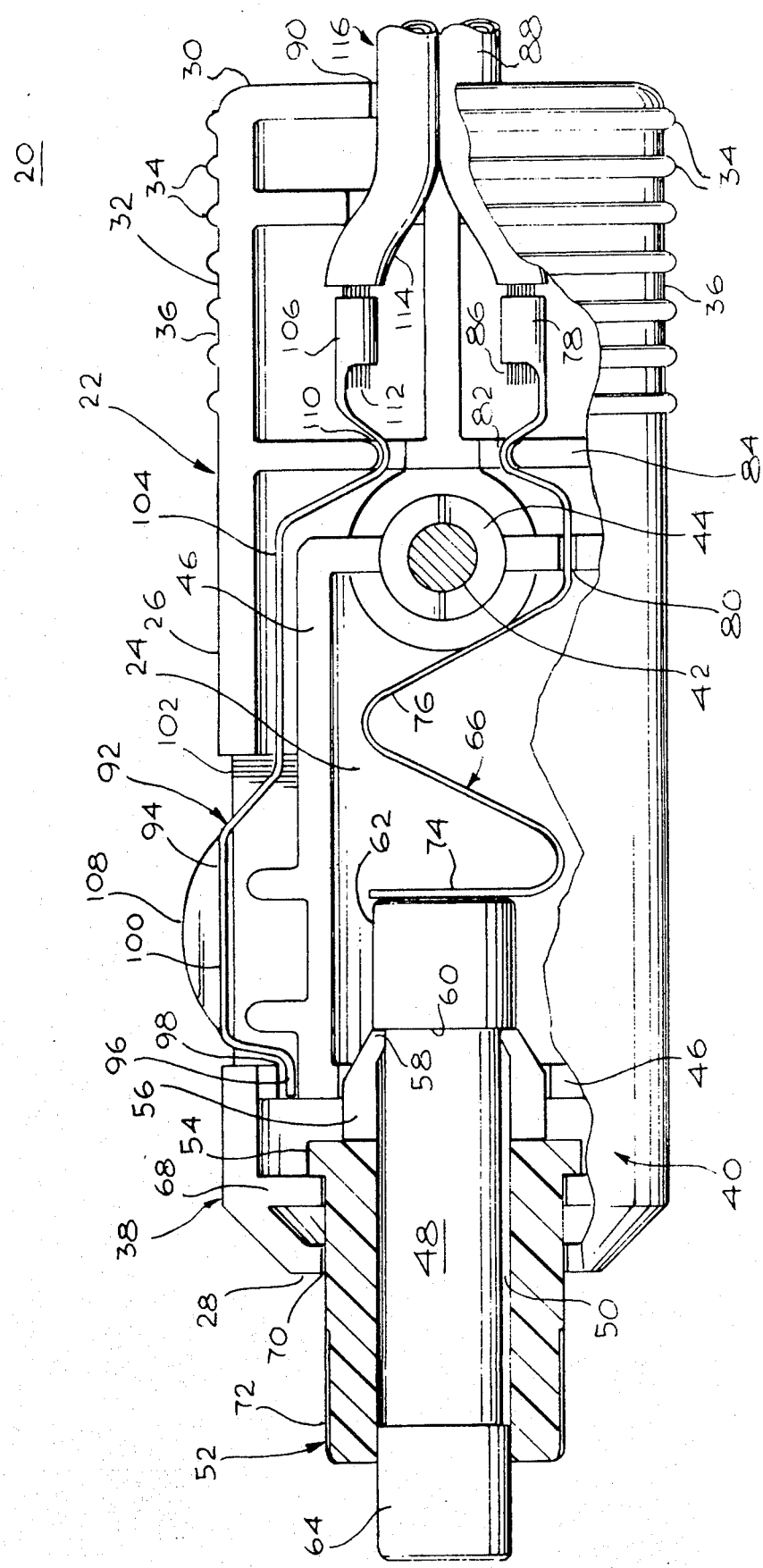
FIG. 1 is a schematic side elevation, partly broken away and partly in section, of a preferred embodiment of the improved cigarette lighter plug assembly of the present invention.

Referring to FIG. 1, a preferred embodiment of the improved cigarette lighter plug assembly of the present invention is schematically depicted therein. Thus, FIG. 1 shows assembly 20, which includes an elongated cylindrical plug body 22 having a hollow interior 24 defined by interconnected sidewall 26, front end wall 28 and rear end wall 30. Rear portion 32 of plug body 22 is provided with gripping means in the form of spaced, raised cylindrical ridges 34 on the exterior surface 36 of sidewall 26. Ridges 34 permit easy manual insertion of plug body 22 into, and withdrawal of, plug body 22 from a cigarette lighter receptacle.

Preferably, plug body 22 is of molded plastic, such as polypropylene or the like, and may be formed into two longitudinally extending halves 38 and 40, preferably secured together as by a plastic pin or aluminum rivet 42 extending transversely through sidewall 26 and a fitting 44 molded into the interior of plug body 22 and supported therein by sidewall braces 46, as shown in FIG. 1. Obviously, other means of securing halves 38 and 40 together could be employed, if desired.

Assembly 20 also includes an elongated cylindrical metallic fuse 48 slidably received in a central passageway 50 extending longitudinally through a cylindrical fuse retainer 52 disposed in the interior 24 of plug body 22. Retainer 52 is also preferably formed of molded plastic such as polypropylene or the like. As shown in FIGS. 5-8, retainer 52 is provided with a pair of integral outwardly extending peripheral ears 54 adjacent the rear portion 56 thereof. Portion 56, as shown in FIG. 1, has a rearwardly facing rim or shoulder 58 dimensioned to engage the front face 60 of fuse cap 62 on the rear portion of fuse 48 to prevent forward movement of cap 62 relative to portion 46. Fuse 48 also has a front fuse cap 64 for directly contacting an electrical terminal of a cigarette lighter receptacle (not shown).

A first metallic contact spring 66 biases cap 62 forward against shoulder 58 and also, thus biases ears 54 of fuse retainer 52 forward against stop means in the form of a transversely extending retaining wall 68 in interior 24, secured to sidewall 26 as shown in FIG. 1. It will be noted that front endwall 28 of plug body 22 has a central opening 70 forwardly through which the front, preferrably knurled portion 72 of fuse retainer 52, extends while cap 64 extends forward of portion 72 when biased forward, as previously described by first spring contact 66. Thus, cap 64 is enabled to efficiently electrically contact a terminal of a cigarette lighter receptacle.

First spring contact 66 has a vertically disposed flat front end 74, an intermediate multi-curved portion 76 and an electrical conduit wire-grippng ear end 78. Spring contact 66 extends longitudinally in interior 24 and is releasably held in place by a guideway 80 in brace 46, and a guideway 82 in a cross-support 84 secured to sidewall 26 in interior 24.

As shown in the schematic top plan view in FIG. 2, spring contact 66 preferably is a flat plate of phosphor bronze spring metal suitably bent into the shape indicated in FIG. 1, and end 78 thereof may be U-shaped to grip and encircle the interior 24 of the unsheathed wires 86 of a first electrical conduit 88, the latter extending rearwardly of plug body 22 through a rear opening 90 in rear endwall 30.

A second spring contact 92 is disposed longitudinally in interior 24 and comprises a flat plate 94 which is bent into the configuration shown in FIGS. 1, 3 and 4. Thus, plate 94 includes a front end 96 disposed within a detent 98 formed in brace 46 (FIG. 1), a contact section 100 extending laterally of plug body 22 through an opening 102 in sidewall 26, an intermediate curved portion 104, and a conduit wire-gripping rear end 106.

Section 102 includes a dome-shaped protrusion 108 adapted to cause plug body 22 to wedgingly fit into a cigarette lighter receptacle with protrusion 108 forcibly contacting the terminal forming the sidewall of the receptacle. Such wedging contact causes plate 94 to flex in interior 24, while detent 98 and guideway 110 in cross-support 84 hold plate 94 in position. Neither spring contact 66 nor spring contact 92 shifts sufficiently during operation of assembly 20 to displace ends 78 and 106 and to cause appreciable strain on the connections between end 78 and wire 86 and that between end 106 and unsheathed wires 112 of conduit 114 gripped by end 106. Conduit 114 joins 88 to form the two electrically isolated leads of cord 116; cord 116 passing rearwardly from plug 22 through opening 90 for connection to an electrical appliance (not shown) or the like.

Assembly 20 is then insertable into a vehicle cigarette lighter socket so that cap 64 directly and fully contacts one terminal and protrusion 108 contacts the other terminal of the socket to permit current to freely flow through the vehicle's electrical system and through cord 116 to energize an electrical motor, etc., as desired. Thus, assembly 20 is simple, inexpensive, durable, easy to assemble and disassemble and efficient, safe, full electrical contact with the vehicle's electrical system being assured. Other advantages of the improved cigarette lighter plug assembly of this invention are as set forth in the foregoing.

Various modifications, changes, alterations and additions can be made in the improved assembly of the present invention and be its components and their parameters. All such modifications, changes, alterations and additions as are within the scope of the appended claims form a part of the present invention.

What is claimed is:

1. An improved cigarette lighter plug assembly, said assembly comprising in combination:

a longitudinally extending plug body having sidewalls and end wall defining a hollow interior and a plurality of openings extending through said walls into communication with said interior, one of said openings extending longitudinally through the front end wall of said plug body;

a fuse retainer releasably disposed in said front opening, said fuse retainer having fuse-receiving passageway extending longitudinally therethrough, substantially coaxial with said front opening and having fuse retaining means;

said fuse retainer including a plurality of interlocking means thereon adapted to coact with mating interlocking means disposed on said plug assembly;

said fuse retaining means comprising a plurality of flexible fingers extending rearwardly from said fuse retainer and adapted to releasably retain a metallic fuse;

a metallic fuse comprising a tubular member enclosing a resistance element with a front end cap and a rear end cap disposed about said tubular member, said caps having an outside diameter greater than the outside diameter of the tubular member, said fuse being releasably disposed longitudinally in said passageway, with the front thereof extending forward of said body and said retainer, said metallic fuse being moveably retained within said passageway by said plurality of fingers, each of which contact said tubular member and thereby prevent movement of said rear end cap forwardly through said passageway;

first contact means in said plug body interior contacting said rear end cap and biasing said fuse forward against said fingers;

second contact means in said plug body interior isolated from said first contact means and extending laterally of said plug body for contact with the sidewall of a cigarette lighter receptacle; and electrical conduits separately connected to said first and second contact means and extending rearwardly of said plug body.

2. The improved cigarette lighter plug assembly as defined in claim 1 wheren:

said fuse retainer extends from the front end wall of said plug body; and the front end cap of said metallic fuse extends forward of said plug body and said fuse retainer.

* * * * *